March 31, 1970 — W. J. SAURER — 3,503,372
BIRD FEEDER OF THE AUTOMATIC TYPE
Filed Nov. 14, 1967 — 2 Sheets-Sheet 1
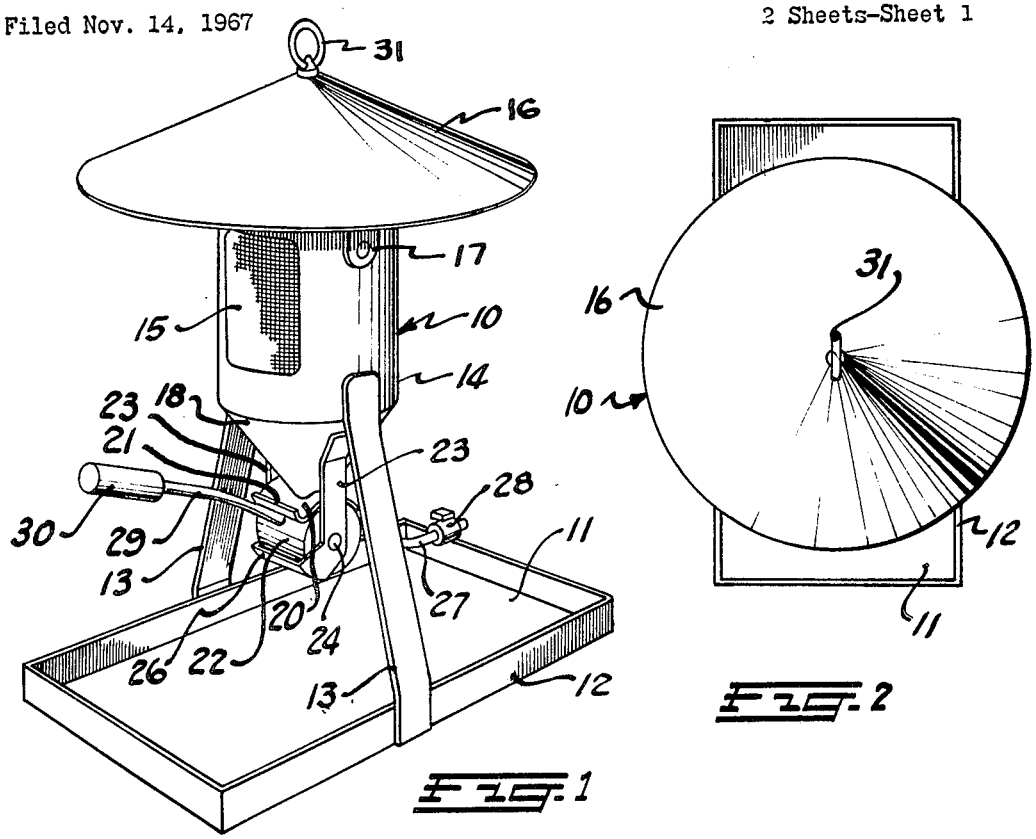
Fig. 1
Fig. 2
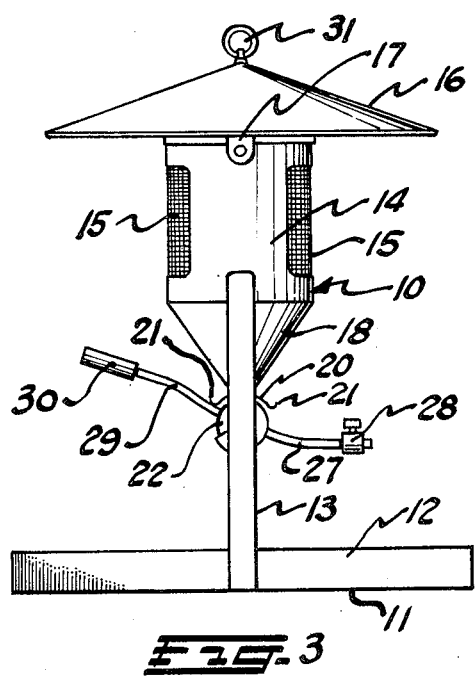
Fig. 3
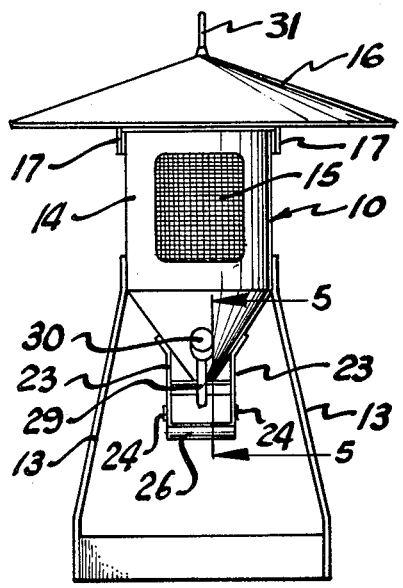
Fig. 4
INVENTOR
WILLIAM J. SAURER March 31, 1970     W. J. SAURER     3,503,372
BIRD FEEDER OF THE AUTOMATIC TYPE Filed Nov. 14, 1967     2 Sheets-Sheet 2

INVENTOR
WILLIAM J. SAURER

United States Patent Office 3,503,372
Patented Mar. 31, 1970

3,503,372
BIRD FEEDER OF THE AUTOMATIC TYPE
William J. Saurer, 3429 Rosemary Ave.,
Glendale, Calif. 91208
Filed Nov. 14, 1967, Ser. No. 682,771
Int. Cl. A01k 5/00
U.S. Cl. 119—55   3 Claims

ABSTRACT OF THE DISCLOSURE

This invention consists of a horizontally disposed and rectangular shaped food tray from the longitudinal center of each side of which upwardly extends a strap type of support whose upper end is secured to the periphery of a vertically disposed cylindrical container in which the feed for the birds is placed. The top of the aforesaid cylindrical container is protected by a cone-shaped metal roof whose periphery extends for a considerable distance out beyond the aforesaid cylindrical container. The bottom of the cylindrical container is provided with a cone-shaped hopper whose open apex terminates in a curved shoe under which is rotatably located a laterally disposed roller having a V-shaped opening therein through which the bird feed will flow when this novel bird feeder is operating, as will hereinafter be described. The aforesaid roller is rotatably supported at each end by a strap that extends downward from each side of the aforesaid cone-shaped hopper. A rod extends outwardly from the lateral center of each side of the aforesaid roller, one of the rods being provided with a longitudinally adjustable counterweight and the other rod being provided with a perch on the outer end thereof on which the bird can perch while eating food from the aforesaid tray.

This invention relates to bird feeders; more particularly, to a bird feeder that is automatic in its operation; still more particularly, to a bird feeder that is especially adapted to the feeding of wild birds since by reason of the feeder being automatic in its operation it can be placed out in the natural habitat of wild birds and will not require daily attention of people whose presence would tend to scare the birds away from the feeder.

It is the principal object of this invention to provide a bird feeder of the automatic type that will permit one to feed any number of birds, particularly wild birds, a predetermined amount of bird food without the personal attention of anyone being near the feeder.

Another object of this invention is to provide a bird feeder of the automatic type that will keep the bird feed in a suitable container until the bird actually lights on a pre-located perch before the feed is automatically dropped down into a tray from which the bird can feed at will.

Another object of this invention is to provide a bird feeder of the automatic type that is provided with a roof that will protect the bird and its food from the weather.

Still another object of this invention is to provide a bird feeder of the automatic type of the character herein described that has a minimum number of parts so designed and assembled thereby requiring a minimum amount of attention, the combination of the parts being so arranged as not to jam or get out of order.

Other and further objects and advantages of this invention of a bird feeder of the automatic type will no doubt come to mind as the reading of this specification and its appended claims continues and the attached drawings are examined.

Figure 5:
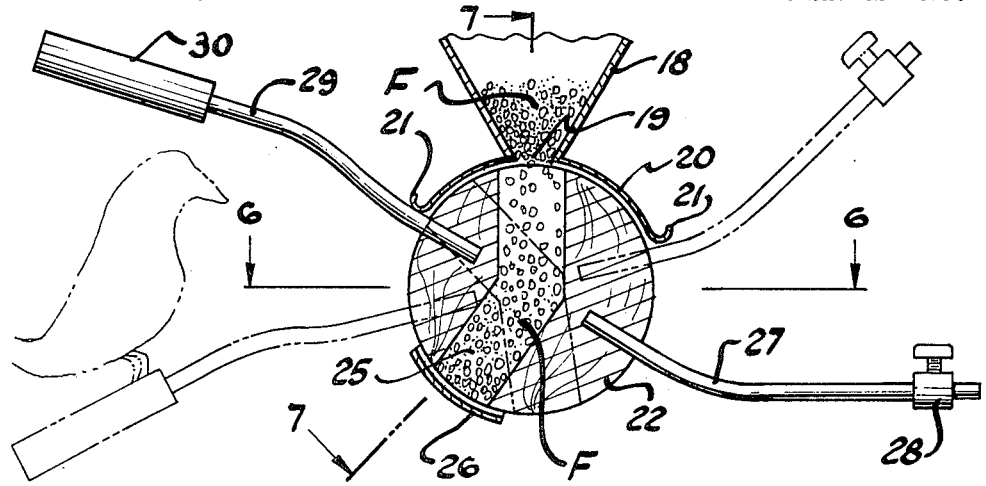
Figure 6:
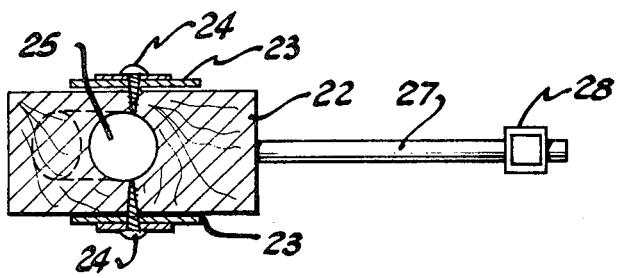
Figure 7:
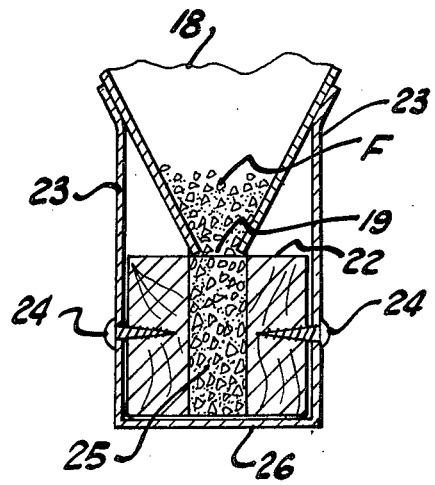

In the drawings:
FIG. 1 is a pictorial view of this invention of a bird feeder of the automatic type in a ready-to-use position.
FIG. 2 is a top view of this invention.
FIG. 3 is a side view of this invention.
FIG. 4 is a view of that end of this invention on which a bird will sit.
FIG. 5 is a sectional view of a portion of this invention, taken vertically along line 5—5 of FIGURE 4, and viewed in the direction indicated by the arrows.
FIG. 6 is a horizontally disposed sectional view of this invention, taken along line 6—6 of FIGURE 5, and viewed in the direction indicated by the arrows.
FIG. 7 is a sectional view of this invention, taken along line 7—7 of FIGURE 5, and viewed in the direction indicated by the arrows.

In the several views of the drawings, like parts are indicated by like reference numbers.

The reference number 10 indicates this invention of a bird feeder of the automatic type in its entirety.

The aforesaid feeder embodies a horizontally disposed rectangular flat food tray 11 having an upturned periphery 12 that will prevent the food from falling out of the tray. A strap 13 extends upward, and to some extent, inward laterally from the longitudinal center of the aforesaid periphery 12 of the food tray. The periphery 12 is in the form of a rigid member. The upper end of each of the two straps 13 is suitably secured to the lower portion of the vertically disposed cylindrical food container 14 whose body is provided with two diametrically opposite screens 15 that are best shown in FIGURE 3 of the attached drawings. A cone-shaped roof 16 is removably secured to the top of the aforesaid food container 14 by means of two diametrically opposite and short straps 17. The cone-shaped roof 16 is so secured so that it is actually slightly above the top of the often-mentioned food container 14. The roof 16 being of a diameter greater than the diameter of the food container 14 will offer protection from the weather to both the bird feeding at the feeder and to the food that is in the food tray at the time.

Looking now at FIGURES 1, 4, and 5 of the attached drawings, it will be seen that this invention is provided with a cone-shaped hopper 18 that is secured to, and is a part of, the bottom of the aforesaid food container 14. The hopper, which is of course hollow, is provided with an opening 19 in the apex thereof, that is clearly shown in FIGURES 5 and 7 of the attached drawings. The apex of the hopper 18 is also provided with a curved shoe 20 having upturned edges 21, the shoe being so curved as to closely fit over the periphery of the laterally disposed roller 22 which is rotatably secured to the aforesaid hopper 18 by two diametrically opposite downwardly extending straps 23 whose lower ends support the wood screws 24 which extend inward into the ends of the aforesaid roller 22, thereby forming a supporting axle for the roller which contains V-shaped opening 25 in the lateral center thereof. The lower end of each strap 23 supports a cross-strap 26, clearly shown in FIGURE 5 of the attached drawings. In fact, both of the two aforesaid straps 23 and the cross-strap 26 can, if one so desires, be made in the form of a single U-shaped member, as is suggested in the illustration noted in the attached drawings as FIGURE 7. The purpose of the aforesaid cross-strap 26 being to prevent the bird feed from flowing from the cylindrical container 14 when the feeder is not in actual use feeding a bird.

Looking now at FIGURES 1, 3, and 5 of the attached drawings, it will be seen that the most essential parts of this novel invention are the two opposed rods that project outwardly from the aforesaid roller 22. One rod 27 is provided with a longitudinally adjustable counter weight 28, while the other rod 29 is provided with a cylindrical-shaped perch 30 on the outer end thereof on which a bird will sit when eating food from the aforesaid tray 11. The vertical movement of the aforesaid rods 27 and 29 being determined and stopped by the aforesaid upturned edges 21 of the aforesaid shoe 20.

Having now described the construction of this invention of a bird feeder of the automatic type which can be suspended from any desired tree or the like by means of a small diameter rope, cord, or wire that has its lower end secured to the eye bolt 31 that is in the apex of the aforesaid roof 16 of the bird feeder, the general way in which this invention works will be described for the benefit of those less experienced in the art of the workings of an automatic mechanical device.

The bird food is placed into the aforesaid cylindrical container 14 through either one of the aforesaid screens 15 which can be constructed in the form of a screen door or in the top of the container after the roof 16 has been removed for this purpose. When any bird lights on the aforesaid perch 30, the weight of the bird will cause the roller 22 to rotate to the point where the V-shaped opening 25 therein is not in line with the opening 19 in the apex of the hopper 18 of the cylindrical food container 14 and the lower end of the V-shaped opening is out of line with cross strap 26. This position is shown in dotted lines in FIGURE 5. A predetermined amount of bird food, that is indicated by the capital letter F in FIGURES 5 and 7 of the attached drawings, will now flow from the aforesaid roller 22 down into the food tray 11. It is obvious from examination of the just-mentioned FIGURES 5 and 7 that this invention is so constructed that only the food contained in the V-shaped opening 25 of the roller will be fed to the bird that is on the perch. Should the bird desire more food, he will soon learn that it is first necessary for him to fly off the perch. This is necessary to enable the counter weight 28 on the rod 27 to cause the roller 22 to rotate in the position shown in solid black lines in FIGURE 5 of the attached drawings in order that the V-shaped opening 25 can again fill up with bird food from the hopper 18. The aforesaid cross-strap 26 will prevent the bird food F from flowing out of the V-shaped opening in the roller until a bird lights on the often-mentioned perch 30.

This invention is subject to any and all changes in details and/or modification one may care to make in so long as the changes and/or modifications fall within the scope and intent of the appended claims. For example, the counter-weight 28 can be made in any desired configuration since the weight is used to compensate for the difference in weight between different species of birds depending on where this invention is to be used. Once the counter-weight has been properly set along rod 27, the weight need not be moved unless the feeder is taken to some other place where the weights of the birds are different. For this reason, the counter-weights portion of this novel invention are particularly subject to detail changes in design.

What I now claim as new and desire to secure by Letters Patent is:

1. A bird feeder of the automatic type comprising a horizontal disposed food tray to which is secured upwardly extending straps or the like which support a food container having at the lower end thereof a hopper with an opening in the apex thereof, mechanism secured to the lower end of its hopper which is adapted to feed a predetermined amount of bird food that is placed in the said container to the said tray when any bird lights on the perch that is part of the said mechanism, the said mechanism embodies a laterally disposed roller that is located directly under the opening in the apex of the said hopper, the said roller having a V-shaped opening therein in which flows the bird food from the said container and the said hopper, the said roller being supported at each end by a wood screw or the like that is held by the lower end of a downwardly extending strap from the side of the said hopper, and the lower end of each of the straps supporting a cross strap contoured to the periphery of the said roller, the said cross-strap preventing the bird food from flowing out of the V-shaped opening in the said roller when there is no bird on the said perch.

2. The invention of claim 1, wherein the said roller is also provided with two diametrically opposed rods that extend outwardly from the lateral center of the said roller, one of the said rods being provided with a longitudinally adjustable counter-weight and the other of the said rods being provided with a cylindrical perch on which a bird will sit when obtaining food from the said bird feeder.

3. The invention of claim 2, wherein the apex of the said hopper is provided with a curved shoe that is contoured to the periphery of the said roller, the outer ends of the said shoe being curved upward, the said shoe being of such a length as to control the upward swing of the said rods.

References Cited

UNITED STATES PATENTS

| | | | |
|---|---|---|---|
| 1,016,637 | 2/1912 | Kraxberger et al. | 119—70 |
| 1,019,975 | 3/1912 | Logan | 119—70 |
| 1,369,740 | 2/1921 | Gibbons | 222—452 X |
| 2,888,905 | 6/1959 | Home | 119—55 |
| 3,316,884 | 5/1967 | Viggars | 119—52 |

HUGH R. CHAMBLEE, Primary Examiner